United States Patent [19]
Alimanestianu

[11] 3,874,301
[45] Apr. 1, 1975

[54] ELECTRICAL TRANSPORTATION SYSTEM
[76] Inventor: Mihai Alimanestianu, 468 Park Ave South, Upper Nyack, N.Y. 10016
[22] Filed: Feb. 16, 1973
[21] Appl. No.: 333,045

[52] U.S. Cl................ 104/152, 104/149, 318/211
[51] Int. Cl............................................. B60m 5/00
[58] Field of Search............... 104/152, 149; 191/6; 318/204, 212, 135, 228, 211, 377, 378, 380; 187/29 R

[56] References Cited
UNITED STATES PATENTS

| | | | |
|---|---|---|---|
| 716,101 | 12/1902 | Potter | 318/211 |
| 919,302 | 4/1909 | Armstrong | 104/149 |
| 1,710,326 | 4/1929 | Swartwout | 104/149 |
| 1,743,772 | 1/1930 | Harrington | 318/211 |
| 2,118,219 | 5/1938 | Mellon | 318/228 |
| 2,835,346 | 5/1958 | Burgy | 187/29 R |
| 3,313,992 | 4/1967 | Bohn | 318/212 |
| 3,687,082 | 8/1972 | Burke, Jr. | 104/152 |

*Primary Examiner*—M. Henson Wood, Jr.
*Assistant Examiner*—Reinhard J. Eisenzopf
*Attorney, Agent, or Firm*—Philip G. Hilbert

[57] ABSTRACT

In a transportation system, a vehicle driven by an induction motor, is guided along a given path. Adjacent to the path is at least a section of electrical conductor which is electrically connected to the induction motor by means of pickup or collector shoes on the vehicle. The speed of the vehicle is controlled by varying the frequency of the electrical power fed to the electrical conductor. This can be accomplished by using a power source whose frequency varies with time or by using several power sources, each having a different frequency; each of such power sources being connected to a different segment of the section; such segments being insulated from each other.

2 Claims, 5 Drawing Figures

3,874,301
SHEET 1 OF 3
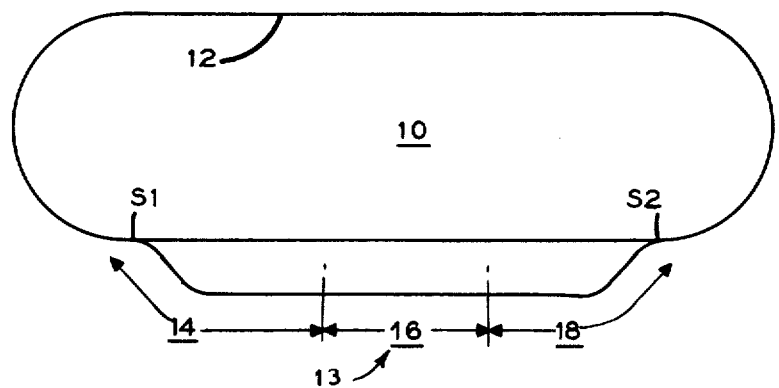
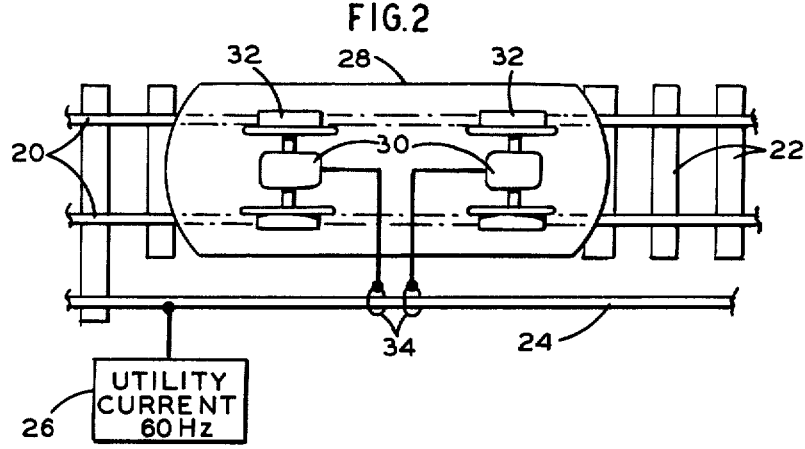
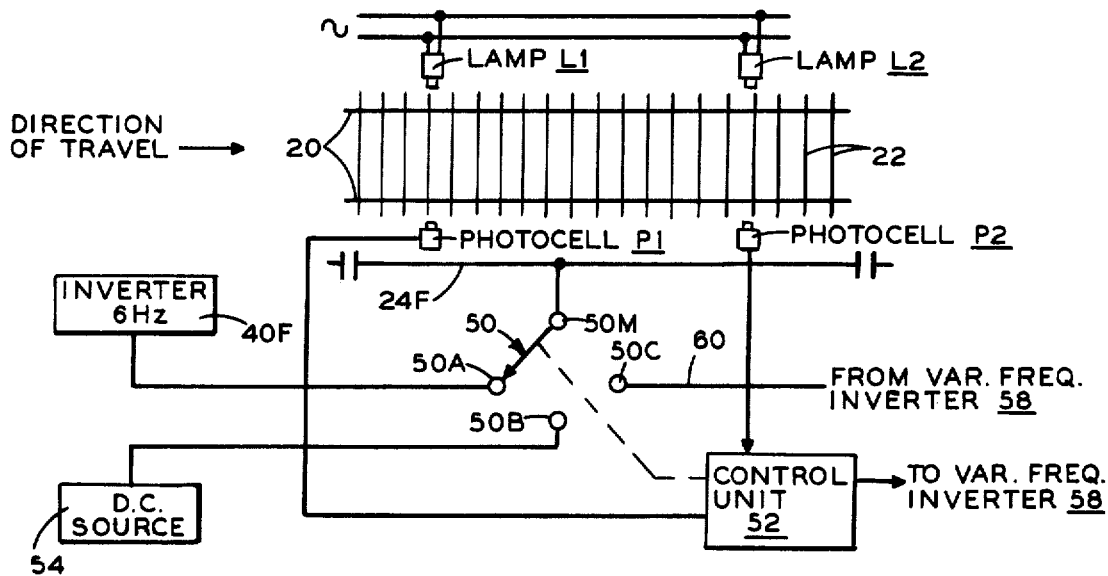

ELECTRICAL TRANSPORTATION SYSTEM

BACKGROUND OF THE INVENTION

This invention pertains to transportation systems and more particularly to systems having a large number of individually powered vehicles operating over fixed guideways such as Personal Rapid Transit Systems.

At the present time the most practical and efficient means of propulsion for such systems is an electric motor on each vehicle; the motors being energized from the wayside by live or "third" rails, together with collector shoes on each vehicle.

In known systems, A.C. power is used, with rectifiers or motor generators on the vehicles for converting the A.C. current to D.C. energy for powering D.C. drive motors on the vehicles. The alternative is to use inverters (frequency changing devices) on the vehicles to energize A.C. drive motors. Such onboard devices control the velocity of the vehicles including acceleration; operating speed and deceleration of the vehicles.

While such systems perform satisfactorily for multivehicle trains, they would be too costly for use in PRT systems which is based on a large number of small capacity individually propelled vehicles. Such costs are increased because each vehicle would require in addition to its propulsion motor, velocity control means such as rectifiers, motor generator sets or inverters. In addition, such velocity control means are relatively delicate and subject to shock and vibration when mounted on moving vehicles; resulting in frequent malfunctions and expensive maintenance costs.

Accordingly, an object of this invention is to provide an improved power supply for electrically propelled vehicles in PRT systems.

Another object of this invention is to provide improved means for controlling the velocity of such vehicles.

A further object of the invention is to provide a control system which is shifted from the vehicles to the right of way, thereby eliminating a number of the disadvantages of conventional control systems.

Briefly, the instant invention contemplates in a transportation system based on a substantial number of electrically propelled vehicles, apparatus for changing the velocity of the vehicles which are guided along a given path. Adjacent and parallel to the path, there is disposed an electrical conductor which is conductively connected to the induction motors on the vehicles which propel the vehicles.

A power source is connected to the electrical conductor which delivers power to such conductor at a varying frequency to thereby control the rotational speed of the induction motor and thus control the operation of the vehicles.

Other objects of this invention will in part be obvious and in part hereinafter pointed out.

DESCRIPTION OF THE DRAWINGS

In the drawings, FIG. 1 is a schematic track or guideway layout of a transportation system embodying the invention;

FIG. 2 is a schematic representation of a portion of the mainline thereof together with a vehicle of the system;

FIG. 4 is a schematic of a station section of the system of FIG. 1; and

DESCRIPTION OF THE PREFERRED EMBODIMENT

Figure 3:
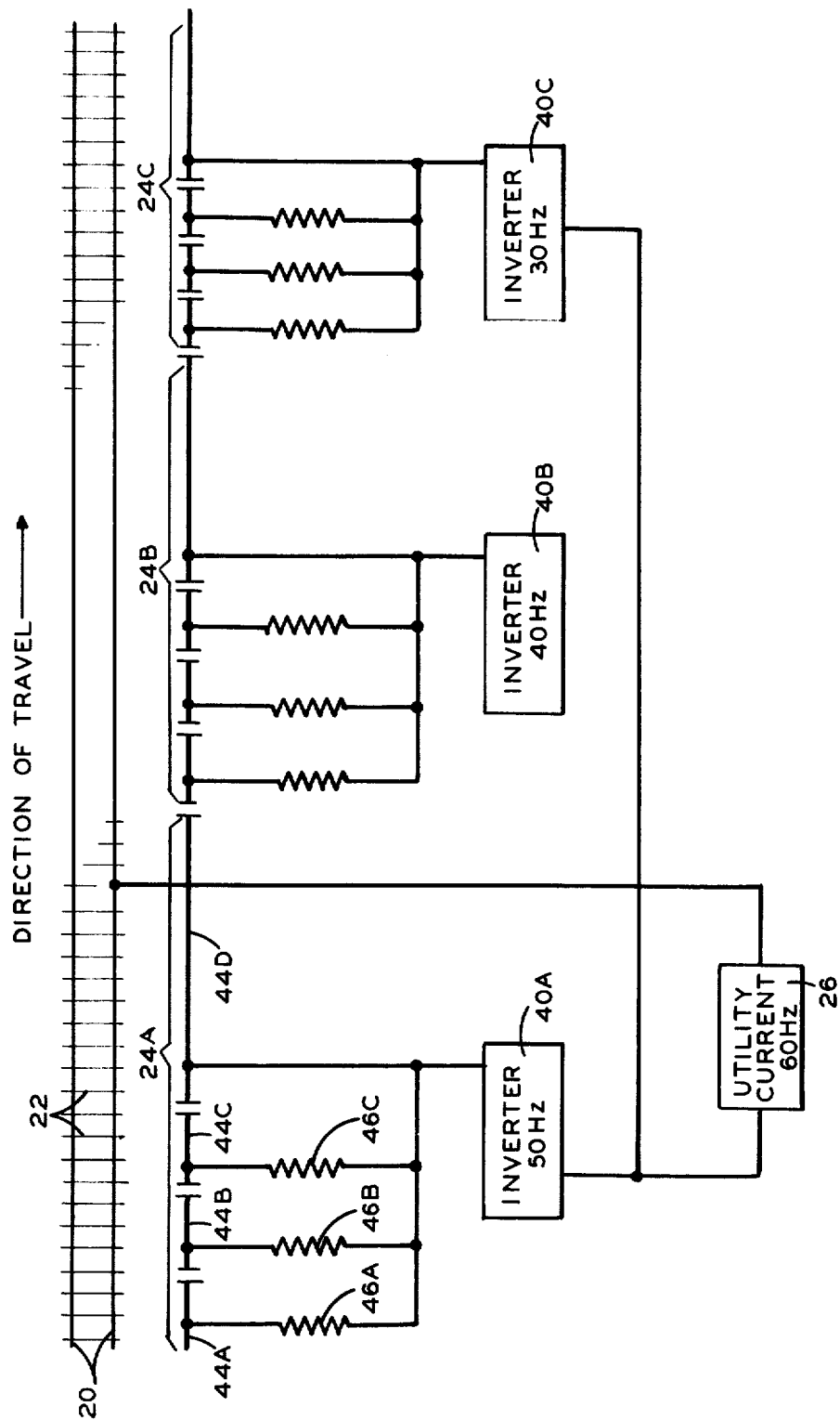
FIG. 3 is a schematic of a portion of a deceleration section of the system of FIG. 1.

In FIG. 1 there is shown a track layout 10 of the essential sections of a transportation system having a mainline portion 12 and a single station spur 13 comprising a decelarating section 14, a station section 16 and an accelerating section 18. Although the layout 10 shows a simple oval mainline section and a single station spur, it is understood that the system may encompass a more complex mainline section and a plurality of station spurs.

As shown in FIG. 2, a typical section comprises track 20 mounted on the usual ties 22. Adjacent track 20 which acts as a guideway and substantially parallel thereto is an electrical conductor 24 or "third rail." A source of utility current 26 (60 Hz A.C.) is connected to conductor 24. A vehicle 28 traverses track 20 by A.C. induction motors 30 mounted on the vehicle and suitably connected by shafts and gearing, not shown, to drive wheels 32.

Motors 30 receive electrical energy via collector shoes 34 which make sliding contact with conductor 24. The rating of motors 30 and the gearing is such that when 60 Hz current of a given magnitude is fed to conductor 24, the vehicle 28 will move on track 20 at a given constant preselected speed over the mainline 12.

In operation, vehicles 28 traverse mainline section 12 and are suitably switched to station spurs 13 by means of remotely controlled switches and switching means. Thus, assuming that a vehicle 28 is travelling on mainline section 12 in a counterclockwise direction, FIG. 1, and is to stop at station section 16. As the vehicle 28 approaches switch S1, the switch is operated by suitable means, not shown, to direct the vehicle on to station spur 13.

When the vehicle is on the deceleration section 14, it is decelerated by applying a progressively decreasing frequency A.C. to the motors 30, with such frequency decreasing from switch S1 toward station section 16. When the vehicle is in station section 16, it is brought to a halt by a braking action which involves applying D.C. to the motors. After a suitable time interval to permit loading and/or unloading, an A.C. whose frequency increases with time from zero Hz to 60 Hz is applied to the electrical conductor of accelerator section 18 to accelerate the vehicle 28 to its normal cruising speed as it enters the mainline section 12 via switch S2 suitable operated by means not shown.

Figure 5:
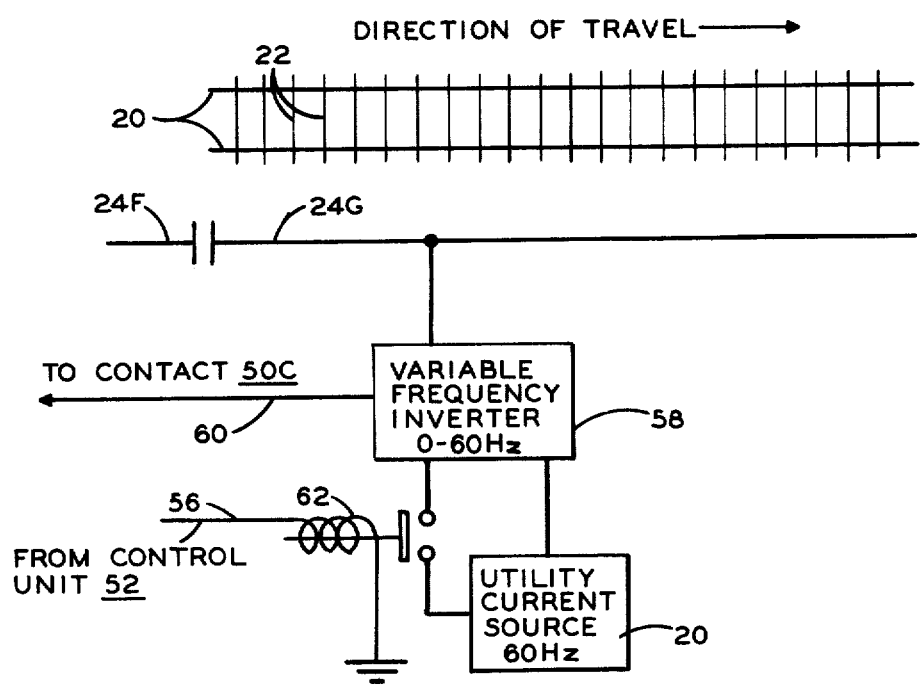
FIG. 5 is a schematic of the acceleration section of the system of FIG. 1.

The means for producing the aforesaid deceleration, acceleration and braking, is set forth in FIGS. 3, 4 and 5. Thus, in FIG. 3 there is shown a portion of deceleration section 14. The electrical conductor or third rail is divided into a plurality of linearly displaced regions 24A, 24B, 24C, etc. which are insulated from each other. Each region is energized by an A.C. of different frequency with the frequencies monotonically decreasing in the direction of travel of the vehicle.

For example region 24A is energized by a 50 Hz inverter or frequency changer; region 24B by a 40 Hz 40B, etc. The inverters 40A, 40B, etc., receive their energy from 60Hz utility current source 26. Thus, as a vehicle moves in the deceleration section 14, the motors 30 are constrained to rotate at successively lower speeds.

If the transition from region to region is too abrupt, the deceleration may be further refined by dividing each region of the electrical conductor into subsections. For example region 24A is divided into subsections 44A, 44B, 44C and 44D with each subsection receiving a different current of progressively increasing amplitude in the direction of travel. Accordingly, subsection 44A is coupled via resistor 46A (or step-down transformer) to inverter 40A; subsection 44B via resistor 46B, subsection 44C via resistor 46C and subsection 44D is connected directly to inverter 40A.

The resistors or stepdown transformers are chosen so that subsection 44A receives 50 Hz A.C. with an amplitude equal to only 40 percent of the maximum value; subsection 44B receives 50 Hz A.C. with an amplitude equal to only 60 percent of the maximum value; subsection 44C receives 50 Hz A.C. with an amplitude equal to only 80 percent of the maximum value; and subsection 44D receives 50 Hz A.C. with maximum amplitude. The remaining regions can be similarly designed. However, it should be noted that the number of regions, the choice of frequencies, the number of subsections and the increments of amplitude attenuation can be varied and not necessarily restricted to the values set forth above.

As the vehicle 28 reaches the end of the deceleration section 14, it is travelling at a highly reduced speed as it enters the station section 16, see FIG. 1.

In FIG. 4, the electrical conductor 24F opposite the tracks 20 is connected to the movable contact 50M of a mechanically stepped switch 50 which is normally connected to fixed contact 50A which is connected to 6Hz inverter 40F. When the vehicle interrupts the light beam between lamp L1 and photocell P1, a pulse is transmitted to control unit 52 which moves contact 50 M to engage fixed contact 50B of switch 50 connected to D.C. source 54 and direct current is fed via conductor 24F to the motors 30 on the vehicles to thereby apply a braking force which completely stops the vehicles. The pulse can also initiate a timing cycle to permit the loading and unloading of passengers. At the end of the timing cycle, the doors of the vehicle are closed, contact 50M is stepped to contact 50C and a pulse is fed via line 56 to energize a variable frequency inverter 58 shown in FIG. 5.

Variable frequency 58, hereinafter more fully set forth, applies an A.C. having a frequency which monotonically increases from zero Hz to 60 Hz in a given time interval. Thus, this frequency increasing A.C. starts energizing the motors of the vehicle which starts moving to the left toward the acceleration section 18.

When the vehicle interrupts the light beam between lamp L2 and photocell P2, a pulse is fed to control unit 52 which steps contact 50M to fixed contact 50A to prepare the station section 16 to receive the next vehicle.

The acceleration section 18 shown in FIG. 5 includes a section of guideway with a section of electrical conductor 24 adjacent thereto. The conductor 24G is connected to variable frequency inverter 58 which can be a motor generator set or the like and which is energized by 60 Hz A.C. and when energized starts generating an alternating current which smoothly increases in frequency from zero Hz to 60 Hz.

When a signal or control pulse is received on line 56 from control unit 52, FIG. 4, solenoid operated switch 62 closes, connecting current source 26 to inverter 68. It will be recalled that this occurs when the vehicle is to leave the station section 16. As the vehicle moves out of the station section 16 as described above, its collector shoes make contact with conductor 24G and the induction motors receive an alternating current which increases in frequency so that the vehicle gradually accelerates to cruising speed by the time it reaches switch S2 for movement on the mainline 12.

It should be noted that the acceleration section could also be similar to the deceleration section except that the frequencies increase in the direction of motion.

It should also be noted that although no current returns have been shown, one of the tracks could be grounded or connected to the current return system.

It is further understood that the instant disclosure relates to the basic propulsion system in respect of the control of the motors on the vehicles from the wayside to regulate deceleration, acceleration and other movements of the vehicles.

It is also understood that the system herein set forth may be applied to various forms of induction motors including linear motors.

I claim:

1. A transportation system comprising: guiding means for guiding a vehicle along a path; an electrical conductor disposed along said guiding means; a vehicle, an induction motor on said vehicle for propelling the vehicle; pickup means on said vehicle for conductively connecting said induction motor to the region of the electrical conductor adjacent said vehicle; a first section of said electrical conductor being disposed adjacent a first portion of said guiding means, a first power source means for applying power of constant frequency to said first section of electrical conductor; a second section of said electrical conductor insulated from said first section and disposed adjacent a decelerating portion of said guiding means, said second section of said electrical conductor comprising a plurality of calinear segments insulated from each other, at least a first of said segments comprising at least two subsegments insulated from each other, a second power source means comprising a plurality of AC power supplies each operating at a different frequency, said power supplies being connected to successive segments such that the frequency of the AC power to such segments decreases from segment to segment in the direction of vehicle travel and means associated with the AC power supply connected to said first segment for transmitting a different amplitude of AC power to each of said subsegments wherein the subsegment first to be utilized by the vehicle receives a lower amplitude of AC power than the second subsegment so that the induction motor produces a progressively increasing braking torque; and a third section of electrical conductor disposed adjacent an accelerating portion of said guiding means and a third power source means for transmitting AC power to said third section of said electrical conductor which has a frequency increasing from a first frequency to a second frequency in a given time interval when said third power source means is energized.

2. The apparatus of claim 1 and further comprising a fourth section of electrical conductor extending from one end of said third section and insulated therefrom, and means operative when said vehicle is at rest and opposite said fourth section of electrical conductor to connect said fourth section, via said third section, to said third power source means and to energize said power source means to transmit power for only said time interval and wherein said first frequency is substantially zero Hz.

* * * * *